Jan. 12, 1965    P. BECKMAN    3,165,426
THERMOPILE
Filed July 30, 1962

INVENTOR.
Paul Beckman
BY

3,165,426
THERMOPILE
Paul Beckman, 944 Henrietta Ave.,
Huntingdon Valley, Pa.
Filed July 30, 1962, Ser. No. 213,395
4 Claims. (Cl. 136—4)

This invention relates to thermopiles, particularly to a sub-miniaturized thermopile that is especially adapted for extremely high temperature operations.

The principle of thermopiles is, of course, old and well-known whereby a plurality of thermocouples have their junctions disposed in the general area of each other and with their leads connected together to obtain a higher output. However, such piles as heretofore constructed have had serious physical and functional limitations especially for extremely high temperature operations. For instance, it has been difficult, among other things, to insulate the junctions from each other with the result that they could not be disposed closely adjacent to each other; or to maintain well-adjusted spacing of the junctions. Because of these and other difficulties, the junctions in prior thermopiles have not had sufficient similar contact with a liquid or gas whose temperatures are to be measured for reasonably accurate measurements.

One object of my invention is to provide an improved thermopile that will effectively insulate the junctions, maintain well-adjusted spacing between the same, and provide a simple and effective means for employing several or more junctions, while insuring that they have substantially the same contact with a medium whose temperature is to be measured and in which the extremely flexible and delicate wires are adequately mechanically supported especially in a thermopile whose junction area is of sub-miniaturized size.

A further object is to provide an improved thermopile structure that, in spite of its sub-miniaturized junction area, is nevertheless relatively simple in its construction so that it may be manufactured within a reasonable cost while still maintaining a high degree of accuracy, reliability and ruggedness, for a device of its nature.

Other objects and advantages will be more apparent to those skilled in the art from the accompanying drawings in which.

Figure 3:
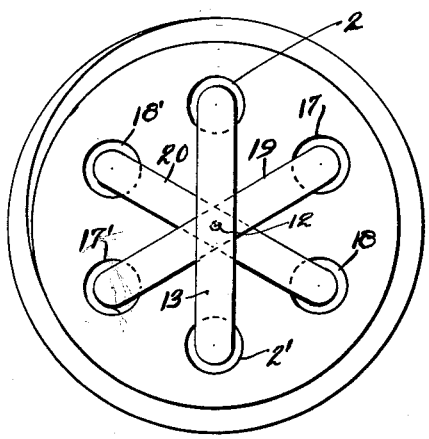
FIG. 3 is a similar enlarged view but looking at the junction end of the thermopile.

In the particular embodiment of my invention shown here for purposes of illustration, I have provided a body of any suitable material to withstand temperatures to be measured and preferably of any usual well-known ceramic material such as alumina. The external surface of this body may be provided either with threads for insertion in a threaded hole of a vessel containing a liquid or gas whose temperature is to be measured, or of any other desired configuration for supporting the thermopile. Extending for the full length of this body is a plurality of axially extending pairs of diametrically opposed passages shown specifically as six in number at 2 and 2', 17 and 17', and 18 and 18' and arranged symmetrically about the axis of the body 1. Extending through each pair of diametrically opposite holes is a tube 3 of insulation material preferably silicon-dioxide, this tube being continuous from one of its terminals 4 to its other terminal 5. The diameter of this tube is preferably about 3 mils and the holes 2 through body 1 are only slightly larger than the tube diameter. Within this 3-mil diameter tube are two passages 6 and 7 extending for the full length of the tube and within each of these length-wise passages are thermocouple wires 8 and 9 of less than 1 mil diameter, and usually of ½ mil diameter, whose thermal junction 12 is located preferably at the center of the bend 13 where the tube 3 is looped back upon itself to provide two parallel legs which pass through the diametrically opposed passages in the body 1. The bend 13 is curved on about an ⅛" radius thereby giving a total width of the bend of about ¼". This degree of curvature is within the elastic limit of the silicon-dioxide material of which the tubes are preferably made, thereby allowing the tube when in its unbent condition to readily receive straight thermocouple wires threaded through the sub-miniaturized passages 6 and 7. Thereafter, the tube may be bent in the form shown in FIG. 1 without any heating or other mechanical manipulation of the material of the tube to allow the two parallel legs of the tube to be inserted in their respective diametrically opposed passages 2 and 2'. Similar assemblies of individual tubes and thermocouple wires generally indicated at 15 and 16 are passed through other diametrically opposed passages such as 17, 17', and 18, 18' with the bends or loops 19 and 20 of these respective tubes disposed in criss-crossed fashion with bend 13 as shown in FIG. 3. The junction points of the wires in each pair of passages of tubes 15 and 16 are disposed in axial alignment with the junction point 12 of the tube 3.

Figure 1:
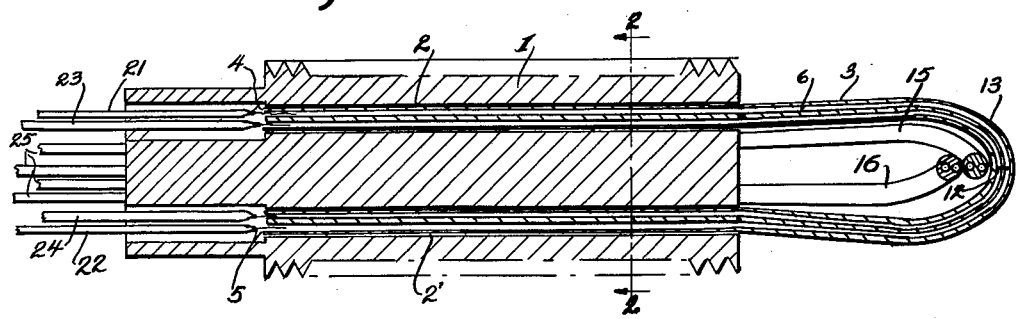
FIG. 1 is a very much enlarged longitudinal sectional view of my improved thermopile.
Figure 2:
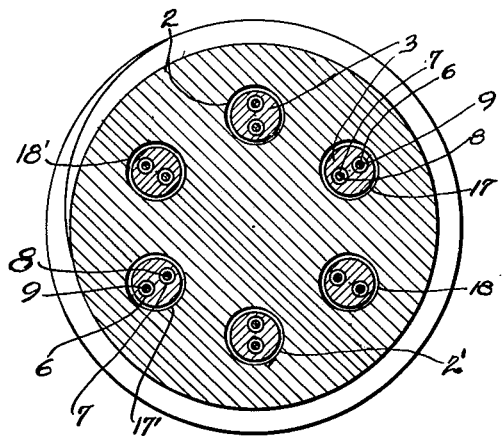
FIG. 2 is a cross-sectional view taken substantially on the line 2—2 of FIG. 1, but still further enlarged.

The ends of the thermocouple wires which for purposes of clarity are omitted from the passages in FIG. 1 are connected at the outer ends to leads 21, 22 and 23, 24. These leads are then connected in series with the similar leads generally indicated at 25, for the thermocouple wires of the other tubes.

As a result of my improved construction of using ceramic tubes with passages extending throughout their length and of having these tubes of such minute size that they may bend 180° without exceeding the elastic limit of the ceramic material, permits a close adjacent criss-cross nesting or cluster of a large number of junctions located in line with each other and still have all of these junctions and their thermocouple wires extremely well mechanically supported, against physical damage or shock as well as insuring highly effective electrical insulation between the junctions.

Not only do my continuous ceramic tubes and their looped construction permit a relatively simple device to be manufactured and at the same time obtain the many desirable qualities above mentioned as well as obtaining extreme ruggedness, but also the construction has the further advantage that the tubes are impervious to moisture and liquids, and resistant to corrosive fluids.

It will, of course, be understood that various changes in details of construction and arrangement of parts may be made by those skilled in the art without departing from the spirit of the invention as set forth in the appended claims.

I claim:

1. A thermopile comprising, in combination, a body having at least a plurality of pairs of substantially parallel passages, each pair of passages being disposed on substantially diametrically opposed sides of the body, a single continuous tube extending through one of said passages beyond the end of said body and looping back through a diametrically opposed passage, and another single continuous tube extending through another one of the pairs of passages beyond said end of the body and then looping back to extend into a diametrically opposed passage, the loops crossing each other in substantially adjacent relation, and thermocouple wires extending through said tubes with their thermocouple junctions in the loops of said tubes so that said junctions are substantially in alignment with each other.

2. The combination set forth in claim 1 further characterized in that the tubes are of a ceramic material which are stressed within their elastic limit when bent to form the loops.

3. The combination set forth in claim 1 further characterized in that each tube has a plurality of passages containing thermocouple wires.

4. The combination set forth in claim 1 further characterized in that each tube is formed of silicon-dioxide ceramic material with an outside diameter of approximately 3 mils and the loop of the tubes has a radius of about ⅛" outside diameter which is within the elastic limit of the ceramic material.

References Cited in the file of this patent

UNITED STATES PATENTS

| | | |
|---|---|---|
| 2,054,120 | De Florez | Sept. 15, 1936 |
| 2,454,229 | Sparrow | Nov. 16, 1948 |
| 2,494,833 | Ray | Jan. 17, 1950 |
| 2,509,825 | Keyser | May 30, 1950 |
| 2,645,675 | Arvin | July 14, 1953 |